United States Patent
Wada et al.

(10) Patent No.: US 8,990,131 B2
(45) Date of Patent: Mar. 24, 2015

(54) BOTTOM SEDIMENT DETERMINATION DEVICE, ULTRASONIC FINDER, AND METHOD AND PROGRAM FOR SETTING PARAMETERS

(75) Inventors: Tomoo Wada, Nishinomiya (JP); Yuji Onishi, Nishinomiya (JP)

(73) Assignee: Furuno Electric Co., Ltd., Nishinomiya (JP)

( * ) Notice: Subject to any disclaimer, the term of this patent is extended or adjusted under 35 U.S.C. 154(b) by 364 days.

(21) Appl. No.: 13/311,206

(22) Filed: Dec. 5, 2011

(65) Prior Publication Data

US 2012/0143803 A1 Jun. 7, 2012

(30) Foreign Application Priority Data

Dec. 6, 2010 (JP) ................................ 2010-270993

(51) Int. Cl.
*G06F 15/18* (2006.01)
*G01S 15/88* (2006.01)
*G06N 3/02* (2006.01)
*G01S 7/539* (2006.01)

(52) U.S. Cl.
CPC . *G01S 15/88* (2013.01); *G06N 3/02* (2013.01); *G01S 7/539* (2013.01); *G01V 2210/62* (2013.01); *Y10S 706/929* (2013.01)
USPC .......................................... 706/20; 706/929

(58) Field of Classification Search
USPC ................. 706/15, 18, 20, 928, 929
See application file for complete search history.

(56) References Cited

U.S. PATENT DOCUMENTS

| 4,924,448 | A | * | 5/1990 | Gaer ................................ 367/88 |
| 5,999,638 | A | * | 12/1999 | Takeo et al. .................... 382/132 |
| 6,362,783 | B1 | * | 3/2002 | Sugiura et al. ................. 342/457 |
| 6,539,304 | B1 | * | 3/2003 | Chansarkar .................... 701/460 |
| 7,565,006 | B2 | * | 7/2009 | Stam et al. ....................... 706/15 |
| 7,991,721 | B2 | * | 8/2011 | Gilboa-Freedman et al. .. 706/20 |
| 2008/0103695 | A1 | * | 5/2008 | Whiting ......................... 701/213 |
| 2009/0122642 | A1 | * | 5/2009 | Komatsu et al. ................ 367/21 |

FOREIGN PATENT DOCUMENTS

JP 2008-275351 A 11/2008

OTHER PUBLICATIONS

Baruah, P.J. et al. "Neural network modeling of surface chlorophyll and sediment content in inland water from Landsat Thematic Mapper imagery using multidate spectrometer data." Proc. SPIE 4488, Ocean Optics: Remote Sensing and Underwater Imaging, 205. Jan. 16, 2002. pp. 205-212. DOI:10.1117/12.452815.*

(Continued)

*Primary Examiner* — Lut Wong
*Assistant Examiner* — Benjamin Buss
(74) *Attorney, Agent, or Firm* — Birch, Stewart, Kolasch & Birch, LLP

(57) ABSTRACT

This disclosure provide a bottom sediment determining device, which is inputted with an echo signal corresponding to an ultrasonic wave outputted underwater, and determines water bottom sediment using a neural network. The device includes a memory for storing two or more parameters to be used in the neural network so as to be associated with positional information, a receiver for receiving the positional information, an acquisition module for acquiring the parameters corresponding to the positional information, and a setting module for setting the parameters to the neural network.

13 Claims, 6 Drawing Sheets

(56) References Cited

OTHER PUBLICATIONS

Slade Jr, W.H. et al. "Ensemble neural network methods for satellite-derived estimation of chlorophyll β." Neural Networks, 2003. Proceedings of the International Joint Conference on. vol. 1. IEEE, Jul. 2003. pp. 547-552.*

Chakraborty, B. et al. "Acoustic Seafloor Sediment Classification Using Self-Organizing Feature Maps". IEEE Transactions on Geoscience and Remote Sensing, vol. 39, No. 12, Dec. 2001. pp. 2722-2725.*

* cited by examiner

| POSITIONAL INFORMATION ||  CONNECTION WEIGHT |
|---|---|---|
| LATITUDE | LONGITUDE | |
| 38° | 148° | CONNECTION WEIGHT A |
| 40° | 148° | CONNECTION WEIGHT B |
| ⋮ | ⋮ | ⋮ |

FIG. 5

BOTTOM SEDIMENT DETERMINATION DEVICE, ULTRASONIC FINDER, AND METHOD AND PROGRAM FOR SETTING PARAMETERS

CROSS-REFERENCE TO RELATED APPLICATION(S)

The application claims priority under 35 U.S.C. §119 to Japanese Patent Application No. 2010-270993, which was filed on Dec. 6, 2010, the entire disclosure of which is hereby incorporated by reference.

TECHNICAL FIELD

The present invention relates to a bottom sediment determining device, an ultrasonic finder, and a method and program for setting parameters, which discriminate, distinguish or determine a water bottom sediment type based on an echo signal corresponding to an ultrasonic wave outputted underwater.

BACKGROUND OF THE INVENTION

Conventionally, fish finders used for ships, which determines a sea bottom sediment type (rocks, stones, sand, etc.) and displays the sediment type has been known (see JP2008-275351A). The bottom sediment determination is performed by analyzing a sea bottom echo of the transmission pulse of an ultrasonic wave. For example, in a location where the sea bottom is hard like rocks or stones with a rolling surface, a time width of the sea bottom echo is longer and, on the other hand, in a location where the sea bottom is soft like sand or mud with a relatively flat surface, the time width of the sea bottom echo is shorter. On a display screen, a similarity with each bottom sediment type and the most similar bottom sediment type among the bottom sediment types are typically displayed. Such a device disclosed in JP2008-275351A uses a neural network to calculate the similarities of the bottom sediment types; thereby more exact bottom sediment determination is possible.

Since echoes differ for every ocean space even when the bottom sediment types are same, it is desired that the neural network learns from the determination result to modify itself every time each ocean space is examined. The neural network updates (learns) connection weights (weighting coefficients) according to correctness of an output value to improve an accuracy rate of the output value.

However, in the bottom sediment determination, it is difficult to know whether the determination result is correct. For this reason, the device disclosed in JP2008-275351A cannot make the connection weights in the neural network into ideal values and, thus, it is difficult to further improve the accuracy rate of the bottom sediment determination.

SUMMARY OF THE INVENTION

Therefore, the present invention is made in view of the above situations, and provides a bottom sediment determining device, an ultrasonic finder, and a method and program for setting parameters, which can obtain a bottom sediment determination result with high accuracy using a neural network.

According to one aspect of the invention, a bottom sediment determining device is provided. The device is inputted with an echo signal corresponding to an ultrasonic wave outputted underwater, and determines water bottom sediment using a neural network. The device includes a memory for storing two or more parameters to be used in the neural network so as to be associated with positional information, a receiver for receiving the positional information, an acquisition module for acquiring the parameters corresponding to the positional information, and a setting module for setting the parameters to the neural network.

Generally, a neural network is an algorithm which learns (updates) parameters according to the accuracies of output results so that the result closer to correct answers can be outputted. However, since water bottom sediments are difficult at different locations, if the neural network is used for a bottom sediment determination, it is difficult for an operator (e.g., a seaman) to determine whether the result of the bottom sediment determination is correct. For this reason, the parameters to be set to the neural network cannot be learned based on the result of the bottom sediment determination.

Therefore, the configuration of this aspect of the invention stores the positional information and the parameter suitable for the position in advance, acquires the parameters corresponding to the received positional information, and then sets them to the neural network to be used for the bottom sediment determination. Thereby, regardless of the outputs from the neural network, optimum parameters according to the received position can be set to the neural network and, thus, the neural network can obtain the bottom sediment determination result with high accuracy.

The parameters may be obtained by learning through the neural network in advance for every ocean space.

Since the bottom sediment type differs for every ocean space, this configuration stores the parameters learned for every ocean space so as to be associated with the respective ocean spaces. Thereby, the ideal parameters according to the ocean spaces can be set to the neural network, and the bottom sediment determination can be performed with high accuracy.

The memory may store general-purpose parameters, and the acquisition module may acquire the general-purpose parameters when there is no parameter corresponding to the positional information in the memory.

With this configuration, if the parameters corresponding to the positional information are not stored, the general-purpose parameters are acquired and set to the neural network. Thereby, the accuracy of the bottom sediment determination result can be increased to some extent at any locations.

The acquisition module may acquire the parameters corresponding to the positional information closest to the positional information when there is no parameter corresponding to the positional information.

With this configuration, if the parameters according to the received positional information are not stored, the parameters according to the positional information closest to the received positional information are acquired and set. Since the water bottom sediment types in near locations have a high possibility of being alike, the accuracy of the bottom sediment determination result can be increased as high as possible.

The parameters may be obtained by learning through the neural network in advance according to an ocean space.

With this configuration, since the parameters which specialists caused the neural network to learn can be used, the bottom sediment determination result can be obtained with high accuracy.

The receiver may receive GPS signals as the positional information.

This configuration shows a particular example using the GPS signals as a method of acquiring the positional information.

The receiver may receive the positional information inputted by a user.

This configuration shows a particular example of a user input as the method of acquiring the positional information.

According to another aspect of the invention, an ultrasonic finder is provided. The ultrasonic finder includes any one of the bottom sediment determining devices, and a display unit for displaying the result of the bottom sediment determination by the bottom sediment determining device.

The ultrasonic finder stores the positional information and the parameter suitable for the position in advance, acquires the parameters corresponding to the received positional information, and then sets them to the neural network to be used for the bottom sediment determination. Thereby, regardless of the outputs from the neural network, optimum parameters according to the received position can be set to the neural network and, thus, the neural network can obtain the bottom sediment determination result with high accuracy.

According to still another aspect of the invention, a method of setting parameters of a neural network is provided. The neural network is inputted with an echo signal corresponding to an ultrasonic wave outputted underwater and determines water bottom sediment. The method includes storing two or more parameters to be used in the neural network so as to be associated with positional information, receiving the positional information, acquiring the parameters corresponding to the positional information, and setting the parameters to the neural network.

The positional information and the parameter suitable for the position are stored in advance, the parameters corresponding to the received positional information are acquired, and the parameters are then set to the neural network to be used for the bottom sediment determination. Thereby, regardless of the outputs from the neural network, optimum parameters according to the received position can be set to the neural network and, thus, the neural network can obtain the bottom sediment determination result with high accuracy.

According to another aspect of the invention, a computer-executable program is provided. The program causes a computer to set parameters of a neural network that is inputted with an echo signal corresponding to an ultrasonic wave outputted underwater and determine water bottom sediment. The program includes causing a computer to store two or more parameters to be used in the neural network so as to be associated with positional information, causing a computer to receive the positional information, causing a computer to acquire the parameters corresponding to the positional information, and causing a computer to set the parameters to the neural network.

The positional information and the parameter suitable for the position are stored in advance, the parameters corresponding to the received positional information are acquired, and the parameters are then set to the neural network to be used for the bottom sediment determination. Thereby, regardless of the outputs from the neural network, optimum parameters according to the received position can be set to the neural network and, thus, the neural network can obtain the bottom sediment determination result with high accuracy.

BRIEF DESCRIPTION OF THE DRAWINGS

The present disclosure is illustrated by way of example and not by way of limitation in the figures of the accompanying drawings, in which the like reference numerals indicate like elements and in which:

FIG. 5 is a table showing a data table where positional information and connection weights are stored so as to be associated with each other.

DETAILED DESCRIPTION

Hereinafter, one suitable embodiment of a bottom sediment determining device, an ultrasonic finder, a method of setting connection weights, and a parameter setting program according to the present invention is described with reference to the accompanying drawings. In this embodiment, an ultrasonic finder provided with a bottom sediment determining device according to the invention, which is equipped in a ship, and which distinguishes a bottom sediment type (rocks, sand, mud, stones, etc.) of a water bottom, is described. The ultrasonic finder may include a fish finder, a scanning sonar, for example. Note that, the term "water bottom" as used herein refers to any water bottom or any water bottom surface at sea, lake, river, etc.

Figure 1:
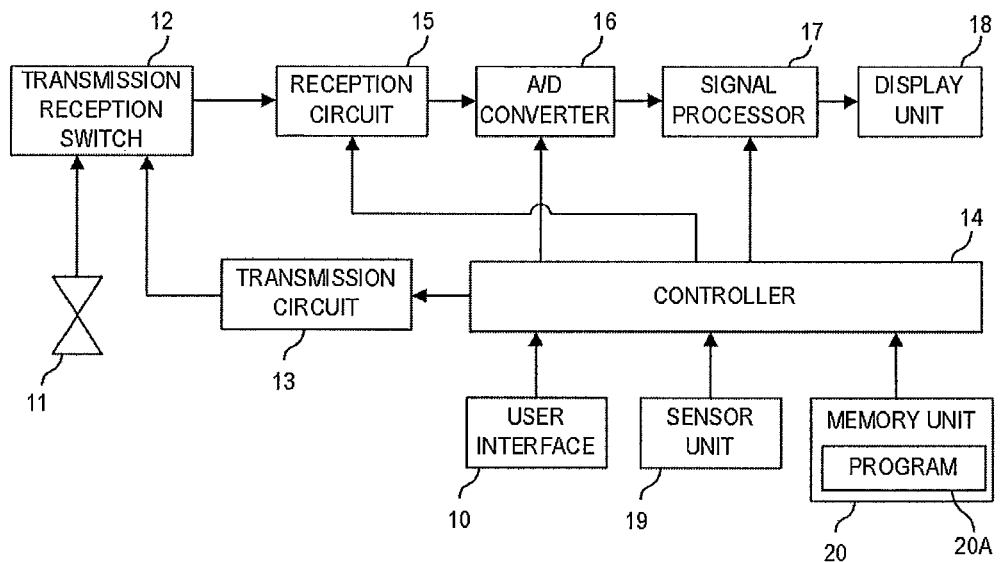
FIG. 1 is a block diagram showing a configuration of an ultrasonic finder according to one embodiment of the present invention.

FIG. 1 is a block diagram showing a configuration of the ultrasonic finder according to this embodiment. The ultrasonic finder includes a user interface 10 ("receiver" in the claims), a transducer 11, a transmission/reception switch 12, a transmission circuit 13, a controller 14, a reception circuit 15, an A/D converter 16, a signal processor 17, a display unit 18, and a sensor unit 19.

The controller 14 reads out a computer-executable program 20A stored in a memory unit 20 and executes the program to entirely control the ultrasonic finder. The controller 14 sets a transmission cycle and a detection range of the transmission circuit 13 according to the various input operations through the user interface 10 (e.g., an input of detection range setting or an input of positional information). Moreover, the controller 14 sets a corresponding sampling period of the A/D converter 16, and instructs executions of various processing to the signal processor 17.

The display unit 18 displays echo data where a vertical axis on a display screen is used as a depth direction and a horizontal axis as a time direction. Note that the ultrasonic finder may not be provided with the display unit 18, but may use an existing display unit of the ship to display the echo data.

The sensor unit 19 inputs into the controller 14 variety of information indicative of a state of the ship, such as ship speed information, a roll angle, and a pitch angle.

The transmission circuit 13 inputs a pulse-shaped signal into the transducer 11 through the transmission/reception switch 12 having a built-in trap circuit. An input timing, a level, and a pulse width of the signal are controlled based on control signal(s) received from the controller 14.

The transducer 11 is typically an oscillator attached to the bottom of the ship in this embodiment, which outputs an ultrasonic wave underwater according to the pulse-shaped signal inputted from the transmission circuit 13. The transducer 11 receives an echo signal which is a reflection of the ultrasonic wave outputted from the transducer 11 itself, where the ultrasonic wave reflects on a target object, such as a school of fish or a water bottom. The transducer 11 then outputs a reception signal corresponding to an intensity of the received echo signal to the reception circuit 15 through the transmission/reception switch 12.

The reception circuit 15 amplifies the inputted reception signal, and then outputs it to the A/D converter 16.

The A/D converter 16 converts the reception signal into a digital signal at a predetermined sampling cycle, and outputs it to the signal processor 17.

The signal processor 17 sequentially records the digitized reception signal on a memory (not illustrated). The signal processor 17 performs a water bottom detection and a bottom sediment determination based on the recorded reception signal. Information indicative of the results of the water bottom detection and the bottom sediment determination is displayed on the display unit 18.

Hereinafter, processing of the signal processor 17 is described in detail.

Figure 2:
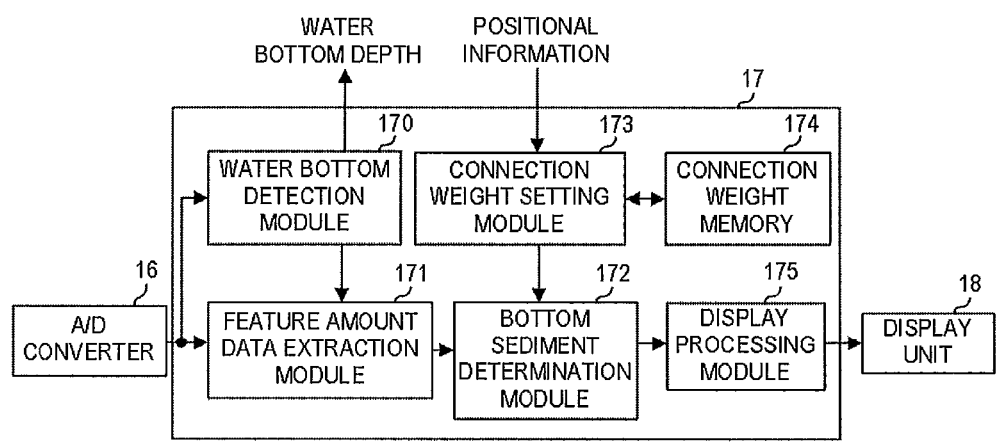
FIG. 2 is a block diagram showing a configuration of a signal processor shown in FIG. 1.

FIG. 2 is a block diagram showing a configuration of the signal processor 17. The signal processor 17 includes a water bottom detection module 170, a feature amount data extraction module 171, a bottom sediment determination module 172, a connection weight setting module 173 (acquisition module, setting module in the claims), a connection weight memory 174, and a display processing module 175.

The reception signal is inputted from the A/D converter 16 into the signal processor 17. The signal processor 17 records the reception signal for one measurement (i.e., for 1 ping) on a memory (not illustrated), and the above-described components of the signal processor 17 performs the following processing each time it records the reception signal for 1 ping.

The water bottom detection module 170 detects a water bottom depth based on the reception signal inputted from the A/D converter 16. The water bottom detection module 170 outputs the detected water bottom depth to the controller 14. The controller 14 calculates a transmission pulse width proportional to the water bottom depth based on the water bottom depth, and it outputs a control signal to the transmission circuit 13 so that the ultrasonic wave having the calculated pulse width is outputted from the transducer 11.

As a detection technique of the water bottom depth may be selected from various techniques, such as a technique based on a timing at which the echo above a threshold level is received, or a technique based on a timing at which a differential value becomes the highest, or a technique based on a timing at which a correlation value becomes the highest where the correlation value is calculated based on the reception signal with respect to a reference signal having a waveform equal (or close) to the pulse width of the outputted ultrasonic wave.

The feature amount data extraction module 171 extracts feature amount data from the reception signal, when the water bottom detection module 170 detects the water bottom. The feature amount data is an integral value of the reception signals of a time-axis waveform. The feature amount data extraction module 171 divides the reception signal into two or more sections, and then extracts the feature amount data from each section.

Here, extraction of the feature amount data based on the feature amount data extraction module 171 is described.

Figure 3:
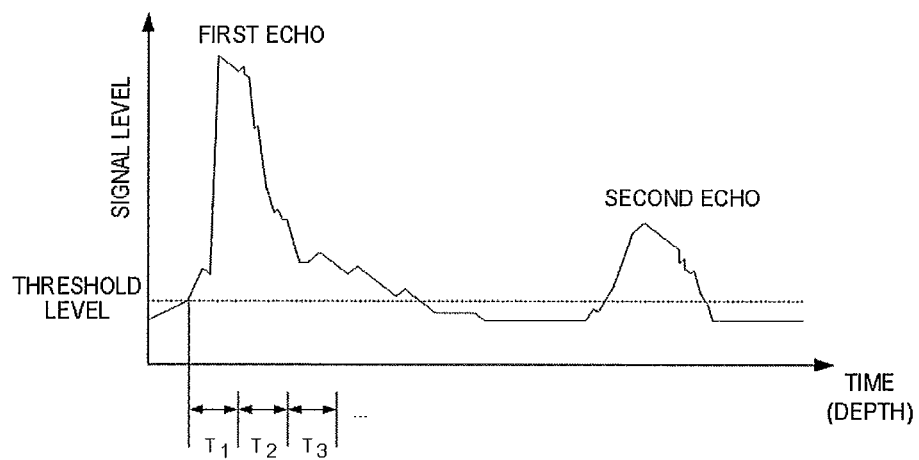
FIG. 3 is a schematic diagram showing a time-axis waveform of a reception signal.

FIG. 3 is a schematic diagram showing a time-axis waveform of the reception signal. FIG. 3 shows a graph where the horizontal axis is set as time and the vertical axis as a signal level of the reception signal. The time of the horizontal axis is a period of time after the ultrasonic wave is outputted from the transducer 11 until the corresponding echo is received (in other words, the water depth).

The feature amount data extraction module 171 divides into two or more time sections ($T_1, T_2, \ldots,$ and $T_n$) the reception signal exceeding the threshold level which is determined to be the reception signal of a water bottom echo, and extracts feature amount data $L_1, L_2, \ldots,$ and $L_n$ for each section. The number of sections may be fixed, and a time length of each section may be variable according to the water bottom depth (i.e., the time). Conversely, the time length of each section may be fixed, and the number of sections may be variable according to the water bottom depth.

Note that, in a location where the water bottom is hard like rocks or stones with a rolling surface, a reflection ratio is high. Therefore, as shown in FIG. 3, the level of a second peak (a secondary echo which is caused by a sound wave being reflected on the water bottom and then further reflected on somewhere else) tends to be higher than a first peak (a primary echo) of the water bottom echo. The feature amount data extraction module 171 may extract the feature amount data of only the primary echo, or may extract the feature amount data of the secondary echo in addition to the primary echo. Since an amplitude ratio of the primary echo and the secondary echo serves as an index of the reflection ratio of the water bottom surface, when the feature amount data extraction module 171 extracts the feature amount data including the two-dimensional echo, the accuracy of the bottom sediment determination in the latter-stage bottom sediment determination module 172 improves.

The bottom sediment determination module 172 uses the two or more feature amount data $L_1$ to $L_n$ extracted by the feature amount data extraction module 171, as inputs, to calculate the similarity by performing matching (pattern recognition or pattern matching) with reference data (template data), thereby generating bottom sediment information. The reference data contains the time-axis waveforms of the echoes for every bottom sediment, such as mud, rocks, sand, and stones, and is stored in advance in the memory (not illustrated).

Figure 4:
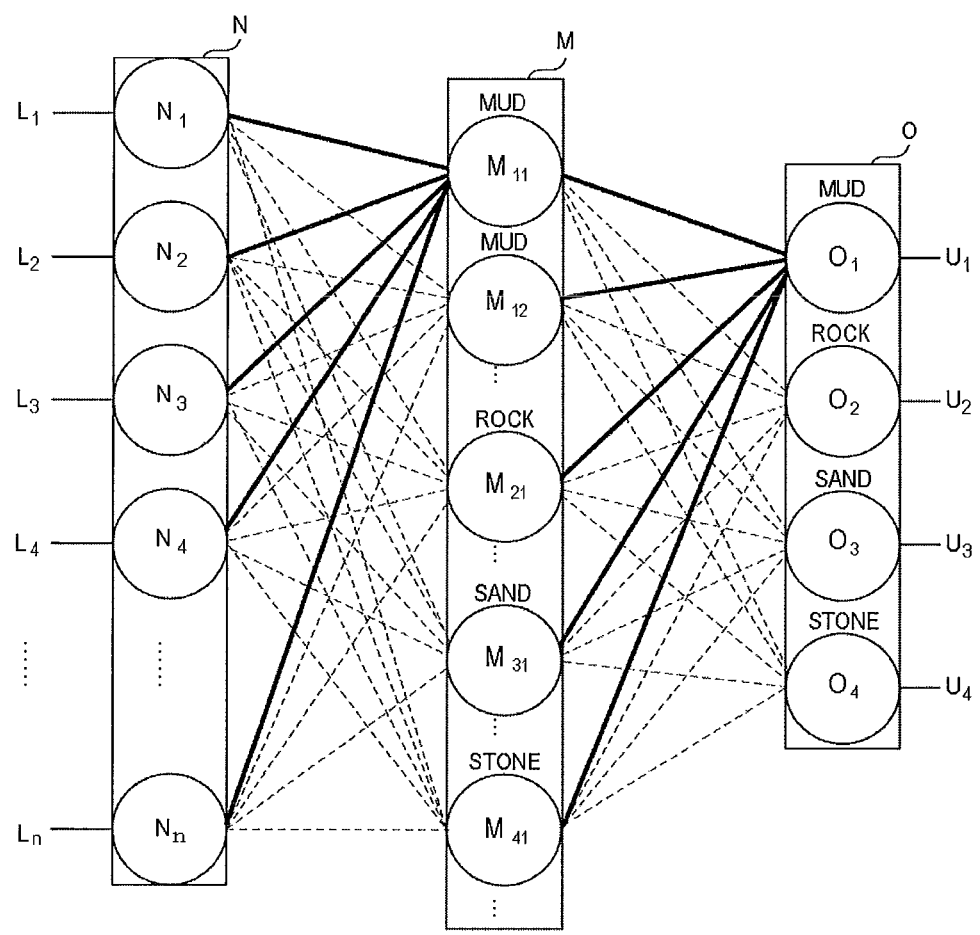
FIG. 4 is a schematic diagram for illustrating a neural network for a bottom sediment determination.

The bottom sediment determination module 172 uses a neural network for the calculation of the similarity with respect to the reference data. FIG. 4 is a schematic diagram for illustrating the neural network in the bottom sediment determination. FIG. 4 shows an example where the bottom sediment types are mud, rocks, sand, and stones.

The neural network of this embodiment is a hierarchical neural network having an input layer N, a middle layer M, and an output layer O.

The input layer N has neuron elements $N_1, N_2, \ldots,$ and N. The feature amount data $L_1$ to $L_n$ extracted by the feature amount data extraction module 171 are inputted into the neuron elements $N_1$ to $N_n$, respectively. The number of the neuron elements of the input layer N is variable according to the number of the feature amount data extracted by the feature amount data extraction module 171.

The neuron elements $N_1$ to $N_n$ output their output values to the middle layer M, when the inputted feature amount data $L_1$ to $L_n$ exceed the threshold. This threshold is suitably changed according to the accuracy of the bottom sediment determination and/or the level to determine the echo to be an echo from the water bottom. The neuron elements $N_1$ to $N_n$ may use the input values as the output values, or may output "1" when the inputted value exceeds the threshold, or may output "0" when the inputted value does not exceed the threshold. Below, the neuron elements $N_1$ to $N_n$ are described as what use the input values as the output values.

The middle layer M has the corresponding number of the neuron elements to the number of the reference data stored. The feature amount data $L_1$ to $L_n$, which are the output values of the neuron elements $N_1$ to $N_n$ of the input layer N, are inputted into the respective neuron elements. Then, each neuron element carries out a weighted addition of the inputted feature amount data, and outputs the output values in accordance with a predetermined input-to-output function. Each neuron element then performs matching of the outputted data with the reference data, and outputs the matching result (i.e., similarity).

In this embodiment, the middle layer M has the neuron elements $M_{11}$, $M_{12}$, ..., $M_{1i}$, $M_{21}$, $M_{22}$, ..., $M_{2j}$, $M_{n1}$, $M_{n2}$, ..., and $M_{nm}$. In the neuron element $M_{nm}$, the subscript "n" corresponds to the bottom sediment type and the subscript "m" corresponds to the number of the reference data of the bottom sediment type.

For example, if three reference data for "mud" are stored in the memory, the neuron elements corresponding to the reference data of mud are the neuron elements $M_{11}$, $M_{12}$, and $M_{13}$. If two reference data for "rocks" are stored in the memory, the neuron elements corresponding to the reference data of rocks are the neuron elements $M_{21}$ and $M_{22}$.

If three reference data for "sand" are stored in the memory, the neuron elements corresponding to the reference data of sand are the neuron elements $M_{31}$, $M_{32}$, and $M_{33}$. If two reference data for "stones" are stored in the memory, the neuron elements corresponding to the reference data of stones are the neuron elements $M_{41}$ and $M_{42}$.

The output values of the neuron elements $N_1$ to $N_n$ are inputted into the respective neuron elements which the middle layer M has (for example, refer to thick lines of FIG. 4). Then, each neuron element which the middle layer M multiplies the feature amount data $L_1$ to $L_n$ by connection weights $P_1$ to $P_n$, respectively, and outputs the output values according to the predetermined input-to-output function.

For example, if the values, which can be obtained by multiplying the feature amount data $L_1$ to $L_n$ by the connection weights $P_1$ to $P_n$, respectively, are above the threshold, the output values according to the input-to-output function may be set to "1," and if the values are below the threshold, the output values may be set to "0." Alternatively, the output values according to the input-to-output function may be according to a sigmoid function corresponding to the values which can be obtained by multiplying the feature amount data $L_1$ to $L_n$ by the connection weights $P_1$ to $P_n$, respectively.

The connection weights $P_1$ to $P_n$ define characteristics of the respective neuron elements of the middle layer M, and they are determined in advance according to the reference data. Below, a method of determining the connection weights $P_1$ to $P_n$ is described.

If the water bottom sediment type is mud or sand, the pulse width of the echo of the ultrasonic wave outputted from the transducer 11 is shorter. On the other hand, if the water bottom sediment type is rocks or stones, the pulse width of the echo of the ultrasonic wave outputted from the transducer 11 is longer. For this reason, the time-axis waveforms of the reference data differ for every bottom sediment type. Therefore, according to the time-axis waveform of the reference data which the neuron element of the middle layer M uses, the connection weight is determined by an importance of the feature amount data of a section, which is selected from the sections ($T_1$, $T_2$, ..., and $T_n$) divided by the feature amount data extraction module 171, when comparing with the reference data.

Below, for example, a case where the neuron element $M_{11}$ uses the reference data of the time-axis waveform where earlier signal levels are higher like the sections of FIG. 3 ($T_1$ and $T_2$), and the subsequent signal levels are lower is described. In this case, the connection weights $P_1$ to $P_n$ for the neuron element $M_{11}$ are set so that the connection weights $P_1$ and $P_2$ are greater than the connection weights $P_3$ to $P_n$.

Thereby, even if the feature amount data $L_3$ to $L_n$ of a time period which has substantially no relation to the comparison with the reference data in the neuron element $M_{11}$ are inputted into the neuron element $M_{11}$, since the feature amount data $L_3$ to $L_n$ are smaller compared with the feature amount data $L_1$ and $L_2$, the neuron element $M_{11}$ can substantially ignore the feature amount data $L_3$ to $L_n$ when comparing with the reference data. As a result, the neuron element $M_{11}$ can calculate the similarity of the inputted feature amount data with the reference data more accurately and at high speed.

The output layer O has the neuron elements $O_1$, $O_2$, $O_3$, and $O_4$. The output values of the neuron elements $M_{11}$, $M_{12}$, ..., $M_{1i}$, $M_{21}$, $M_{22}$, ..., $M_{2j}$, $M_{n1}$, $M_{n2}$, ..., $M_{nm}$ of the middle layer M are inputted into the neuron elements $O_1$, $O_2$, $O_3$, and $O_4$. Then, the neuron elements $O_1$, $O_2$, $O_3$, and $O_4$ multiply their input values by the connection weights $W_{11}$, $W_{12}$, ..., $W_{1i}$, $W_{21}$, $W_{22}$, ..., $W_{2j}$, $W_{n1}$, $W_{n2}$, ..., and $W_{nm}$, respectively, and output the output values according to the predetermined input-to-output function.

Note that the subscripts of the connection weights W (parameters) correspond to the subscripts of the neuron elements M. Moreover, the connection weights W are set by the connection weight setting module 173 described in detail later.

The neuron elements $O_1$, $O_2$, $O_3$, and $O_4$ use the connection weights W to carry out weighted additions to the input values, and they output the output values according to the predetermined input-to-output function. For example, the neuron elements $O_1$, $O_2$, $O_3$, and $O_4$ output the output values, when the results of the weighted additions are above the threshold. The output values of the neuron elements $O_1$, $O_2$, $O_3$, and $O_4$ may be "0" or "1" similar to the middle layer M, or may be the values which can be obtained by carrying out the weighted additions to the input value of the neuron elements $O_1$, $O_2$, $O_3$, and $O_4$.

The neuron element $O_1$ outputs an output value $U_1$ relating to mud. Similarly, the neuron element $O_2$ outputs an output value $U_2$ relating to rocks, the neuron element $O_3$ outputs an output value $U_3$ relating to sand, and the neuron element $O_4$ outputs an output value $U_4$ relating to stones.

For example, when only the output value $U_1$ is outputted, the bottom sediment determination module 172 generates the bottom sediment information indicating that the water bottom sediment type is mud. Moreover, when the output values $U_1$ and $U_2$ are outputted, the bottom sediment determination module 172 generates the bottom sediment information indicating that the water bottom sediment contains mud and rocks 50% each.

Alternatively, if the output layer O outputs the result of weighted addition to the input value as it is, the bottom sediment determination module 172 may generate the bottom sediment information based on a ratio of the output value of each neuron element of the output layer O. In this case, for example, the bottom sediment determination module 172 generates the bottom sediment information indicating that the water bottom sediment contains 70% mud, 20% rocks, and 10% stones.

Returning to FIG. 2, the connection weight memory 174 stores the connection weights W between the middle layer M and the output layer O in the neural network and the positional information so as to be associated with each other. FIG. 5 shows a data table where the positional information and the connection weights W are stored and associated with each other. The data table shown in FIG. 5 contains latitude and longitude information at sea, as the positional information.

Note that, although omitted in FIG. 5, the connection weights A, B, . . . stored in the connection weight memory 174 each contains the connection weights $W_{11}$, $W_{12}$, $W_{1i}$, $W_{21}$, $W_{22}$, . . . , $W_{2j}$, $W_{n1}$, $W_{n2}$, . . . , and $W_{nm}$. Furthermore, the connection weights A and B each contains the connection weights for the neuron elements $O_1$, $O_2$, $O_3$, and $O_4$, respectively. Alternatively, the positional information shown in the table of FIG. 5 may also be an ocean name, such as the Seto Inland Sea or the Pacific Ocean, instead of using the latitude and longitude.

The neural network learns the connection weights W each time in response to the correct answer of the output value (the result of the bottom sediment determination). However, the water bottom sediments differ for every ocean space, and the ultrasonic wave which propagates underwater along the water bottom takes a different propagation mode according to the quality of water (e.g., a water temperature, a salt concentration, etc.). For this reason, the operator (seaman) cannot determine whether the bottom sediment determination result is correct or not, and, therefore, he/she cannot allow the neural network to learn the connection weights W. For this reason, the connection weights stored in the connection weight memory 174 are typically set to ideal values in advance after the various bottom sediment determinations using the neural network were performed in every ocean space and learned through the neural network by the specialists (or the manufacturer of the ultrasonic finder).

For example, when the ship is located at 38° longitude and 148° latitude, the accuracy of the result of the bottom sediment determination performed by the neural network is determined by the specialists. Then, the specialists make the neural network learn and determine the parameters (connection weights) so that the result of the bottom sediment determination approaches the correct answer. The connection weights are stored in the connection weight memory 174 so as to be associated with 38° longitude and 148° latitude.

The connection weight setting module 173 acquires from the connection weight memory 174 the connection weights corresponding to the positional information inputted from the controller 14, and then sets the acquired connection weights to the neuron network of the bottom sediment determination module 172. For example, in FIG. 5, when the ship is located at 38° longitude and 148° latitude, the connection weight setting module 173 sets the connection weights A, C, E, and G corresponding to the positional information to the neural network of the bottom sediment determination module 172.

The connection weight setting module 173 acquires the connection weights corresponding to positional information closest to the inputted positional information, when there is no connection weight corresponding to the inputted positional information in the connection weight memory 174. Since there is a possibility that the water bottom sediment types are alike when positions in question are near to each other, the connection weight setting module 173 can set more ideal connection weights to the neural network by acquiring the connection weights corresponding to the positional information closest to the inputted positional information.

Note that the positional information acquired by the connection weight setting module 173 may be inputted by the operator through the user interface 10, or GPS (Global Positioning System) signals may be received and the positional information may be calculated by a technique of GPS navigation.

Thus, in the ultrasonic finder of this embodiment, the ideal connection weights W are set to the neural network of the bottom sediment determination module 172 based on the position of the ship. Therefore, from the neural network, the output values close to correct answers are outputted, and the ultrasonic finder can generate the bottom sediment information with high accuracy.

Below, an operation executed by the ultrasonic finder of this embodiment is described.

Figure 6:
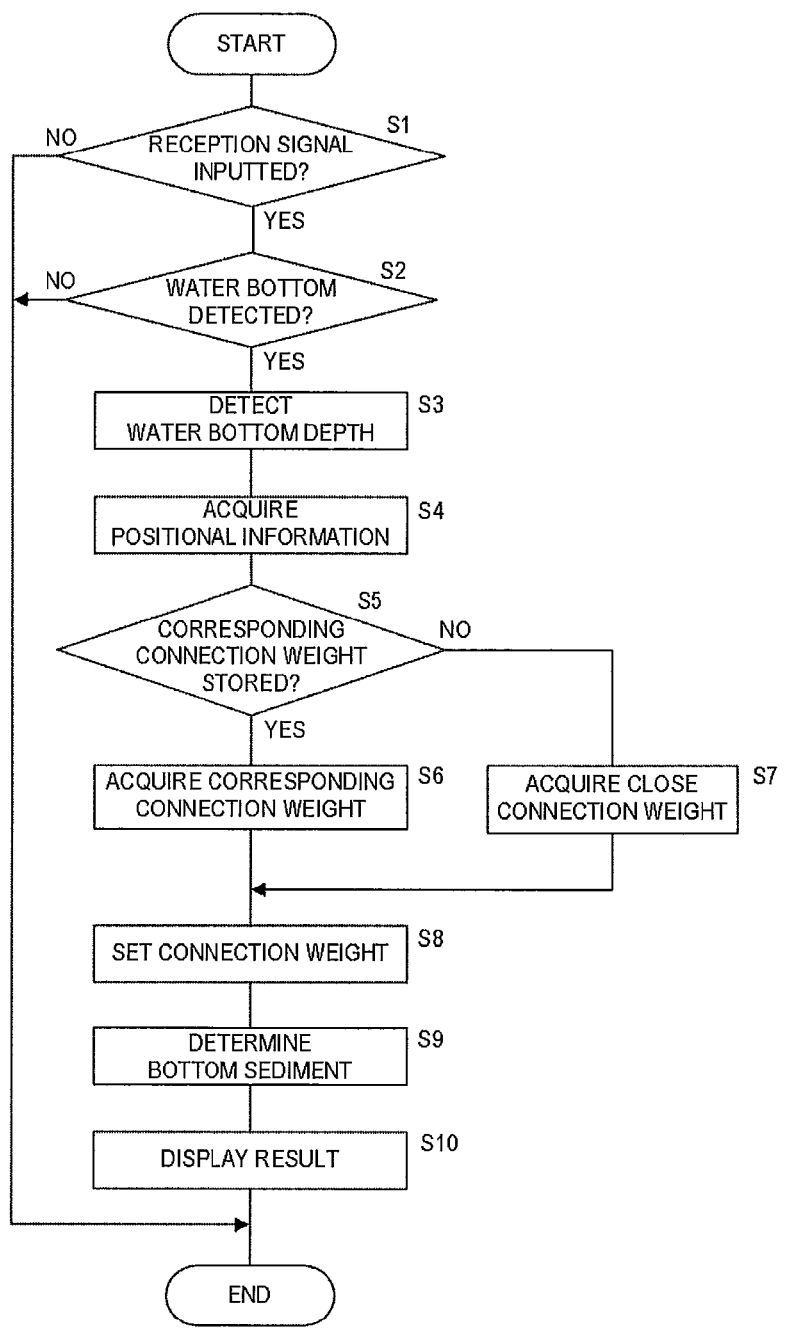
FIG. 6 is a flowchart showing a routine which is executed by the signal processor of the ultrasonic finder.

FIG. 6 is a flowchart showing a routine executed by the signal processor 17 of the ultrasonic finder. The signal processor 17 determines whether the reception signal is inputted (S1). If the reception signal is not inputted (S1: NO), the signal processor 17 ends this routine. If the reception signal is inputted (S1: YES), the signal processor 17 determines whether the water bottom is detected based on the reception signal (S2).

If the water bottom is not detected (S2: NO), the signal processor 17 ends this routine because the reception signal is, for example, a noise. If the water bottom is detected (S2: YES), the water bottom detection module 170 of the signal processor 17 detects the water bottom depth (S3).

The connection weight setting module 173 acquires the positional information from the controller 14 (S4). The positional information may be information manually inputted by the operator, or may be information automatically inputted using the GPS signals.

The connection weight setting module 173 determines whether the connection weights corresponding to the acquired positional information are stored in the connection weight memory 174 (S5). If the corresponding connection weights are stored in the connection weight memory 174 (S5: YES), the connection weight setting module 173 acquires the corresponding connection weights (S6). If the corresponding connection weights are not stored in the connection weight memory 174 (S5: NO), in other words, if the acquired positional information is not stored in the connection weight memory 174, the connection weight setting module 173 acquires the connection weights corresponding to the positional information close to the acquired positional information (S7).

The connection weight setting module 173 sets the acquired connection weights to the neural network of the bottom sediment determination module 172 (S8). The bottom sediment determination module 172 performs the bottom sediment determination using the neural network which is described referring to FIG. 3, by using the connection weights set by the connection weight setting module 173 (S9). The bottom sediment determination module 172 outputs the result of the bottom sediment determination to the display processing module 175, and displays the result on the display unit 18 (S10). After that, this routine ends.

As described above, this embodiment utilizes the neural network for the bottom sediment determination, and sets to the neural network the connection weights determined in advance according to the ship position. Thereby, a highly accurate bottom sediment determination can be performed at any time.

Note that the particular configuration of the ultrasonic finder described in the above embodiment may be suitably changed or modified in design. The operations and effects described above are merely exemplary of suitable operations and effects for the present invention and, therefore, the operations and effects should not be limited to what is described in the above embodiment.

For example, the connection weights set to the neural network may not correspond to the acquired positional information or positional information close the acquired positional information. For example, general-purpose connection weights as general-purpose parameters may be stored in the connection weight memory 174. The general-purpose connection weights mean parameters with which the bottom sediment determination can be performed with certain high probability (for example, above 80%) in any ocean space.

If the acquired positional information is not stored in the connection weight memory 174, the connection weight setting module 173 may acquire the general-purpose connection weights from the connection weight memory 174 and set it to the neural network. Thereby, the ultrasonic finder can always obtain the bottom sediment determination result with an accuracy rate beyond a certain value.

Moreover, although in the above embodiment, the connection weights W are set by the connection weight setting module 173, the ultrasonic finder may learn the connection weights P. For example, the result which is obtained by carrying out the weighted addition to the input values of the middle layer M may be compared with the reference data, and the ultrasonic finder may learn the connection weights P so that the result approaches the reference data. In this case, the matching result with the reference data in the middle layer M can be higher in accuracy.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is designed in at least that way, but may also be configured in ways that are not listed.

What is claimed is:

1. A bottom sediment determining device for being inputted with an echo signal corresponding to an ultrasonic wave outputted underwater, and determining water bottom sediment using a neural network, the device comprising:

a memory for storing a set of two or more synaptic connection coefficients to be used in the neural network so as to be associated with positional information;

a receiver for receiving the positional information, the positional information representing a location where the water bottom sediment is determined;

an acquisition module for acquiring the set of synaptic connection coefficients corresponding to the positional information, said acquiring being accomplished by selecting the set of synaptic connection coefficients from among a plurality of sets of synaptic connection coefficients based on the received positional information, the selected set of synaptic connection coefficients being different from a previously-selected set of synaptic connection coefficients even if a water depth and bottom sediment determination are the same as those associated with the previously-selected set of synaptic connection coefficients; and a setting module for setting the acquired set of synaptic connection coefficients to the neural network.

2. The bottom sediment determining device of claim 1, wherein the sets of synaptic connection coefficients are obtained by learning through the neural network in advance for a plurality of ocean spaces.

3. The bottom sediment determining device of claim 1 or 2 wherein the memory stores general-purpose synaptic connection coefficients, and the acquisition module acquires the general-purpose synaptic connection coefficients when there is no set of synaptic connection coefficients corresponding to the positional information in the memory.

4. The bottom sediment determining device of claim 1, wherein the acquisition module acquires the set of synaptic connection coefficients corresponding to the positional information closest to the received positional information when there is no set of synaptic connection coefficients corresponding to the received positional information.

5. The bottom sediment determining device of claim 1, wherein the sets of synaptic connection coefficients are obtained by learning through the neural network in advance according to an ocean space.

6. The bottom sediment determining device of claim 1, wherein the receiver receives GPS signals as the received positional information.

7. The bottom sediment determining device of claim 1, wherein the receiver receives the positional information inputted by a user.

8. An ultrasonic finder, comprising:

a bottom sediment determining device of claim 1; and a display unit for displaying the result of the bottom sediment determination by the bottom sediment determining device.

9. The device of claim 1, where the selected set of synaptic connection coefficients correspond to the received positional information and the previously-selected set of synaptic connection coefficients correspond to previously-received positional information different from the received positional information.

10. A method of setting parameters of a neural network that is inputted with an echo signal corresponding to an ultrasonic wave outputted underwater and determines water bottom sediment, the method comprising:

storing a set of two or more synaptic connection coefficients to be used in the neural network so as to be associated with positional information;

receiving the positional information, the positional information representing a location where the water bottom sediment is determined;

acquiring the set of synaptic connection coefficients corresponding to the positional information, said acquiring being accomplished by selecting the set of synaptic connection coefficients from among a plurality of sets of synaptic connection coefficients based on the received positional information, the selected set of synaptic connection coefficients being different from a previously-selected set of synaptic connection coefficients even if a water depth and bottom sediment determination are the same as those associated with the previously-selected set of synaptic connection coefficients; and setting the acquired set of synaptic connection coefficients to the neural network.

11. The method of claim 10, where the selected set of synaptic connection coefficients correspond to the received positional information and the previously-selected set of synaptic connection coefficients correspond to previously-received positional information different from the received positional information.

12. A non-transitory computer-readable medium having embodied thereon a computer-executable program for causing a computer to perform a method of setting synaptic connection coefficients of a neural network that is inputted with an echo signal corresponding to an ultrasonic wave outputted underwater and determine water bottom sediment, the method comprising:

storing a set of two or more synaptic connection coefficients to be used in the neural network so as to be associated with positional information;

receiving the positional information, the positional information representing a location where the water bottom sediment is determined;

acquiring the set of synaptic connection coefficients corresponding to the positional information, said acquiring being accomplished by selecting the set of synaptic connection coefficients from among a plurality of sets of synaptic connection coefficients based on the received positional information, the selected set of synaptic connection coefficients being different from a previously-selected set of synaptic connection coefficients even if a water depth and bottom sediment determination are the same as those associated with the previously-selected set of synaptic connection coefficients; and setting the acquired set of synaptic connection coefficients to the neural network.

13. The medium of claim 12, where the selected set of synaptic connection coefficients correspond to the received positional information and the previously-selected set of synaptic connection coefficients correspond to previously-received positional information different from the received positional information.

* * * * *